United States Patent
Antier et al.

(10) Patent No.: US 10,369,729 B2
(45) Date of Patent: Aug. 6, 2019

(54) STOPPER FOR CLOSING NECK OF CONTAINER

(71) Applicant: Tetra Laval Holdings & Finance S.A., Pully (CH)

(72) Inventors: Grégory Antier, Pully (CH); David Jouve, Pully (CH)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 897 days.

(21) Appl. No.: 14/784,334

(22) PCT Filed: Apr. 10, 2014

(86) PCT No.: PCT/EP2014/057319
§ 371 (c)(1),
(2) Date: Oct. 14, 2015

(87) PCT Pub. No.: WO2014/170214
PCT Pub. Date: Oct. 23, 2014

(65) Prior Publication Data
US 2016/0121525 A1 May 5, 2016

(30) Foreign Application Priority Data
Apr. 15, 2013 (FR) ..................................... 13 53385

(51) Int. Cl.
*B29C 45/00* (2006.01)
*B29C 45/36* (2006.01)
(Continued)

(52) U.S. Cl.
CPC ...... *B29C 45/0081* (2013.01); *B29C 45/0055* (2013.01); *B29C 45/36* (2013.01);
(Continued)

(58) Field of Classification Search
CPC ............................ B65D 55/02; B29C 45/0062
(Continued)

(56) References Cited

U.S. PATENT DOCUMENTS 5,947,316 A * 9/1999 Guillonnet ............. B65D 5/748
220/269
6,234,333 B1 5/2001 Federighi et al.
(Continued)

FOREIGN PATENT DOCUMENTS

WO  WO 2008/031766 A1  3/2008

OTHER PUBLICATIONS

International Search Report and Written Opinion dated May 13, 2014 in corresponding PCT International Application.

*Primary Examiner* — Anthony D Stashick
*Assistant Examiner* — Raven Collins
(74) *Attorney, Agent, or Firm* — Finnegan, Henderson, Farabow, Garrett & Dunner LLP

(57) ABSTRACT

A method for manufacturing a stopper for closing a neck of a container comprises a first step of molding the stopper in one piece. The stopper includes a sealing membrane provided with a central opening, a tubular stem centered on an axis and extending from the sealing membrane around the central opening, and a capsule connected, by a tear wall, to a free end of the stem. The capsule is configured to be wedged in the stem to seal the neck of the container. The method comprises a second step in which, while the tear wall is intact, a force, in line with the axis, is applied to the stopper so as to break the tear wall and move the capsule inside the stem until the capsule is wedged in the stem.

20 Claims, 7 Drawing Sheets

(51) Int. Cl.
*B67D 3/00* (2006.01)
*B65D 47/36* (2006.01)
*B29C 45/26* (2006.01)
*B29L 31/56* (2006.01)

(52) U.S. Cl.
CPC ........... B65D 47/36 (2013.01); B67D 3/0032 (2013.01); *B29C 45/261* (2013.01); *B29C 2045/363* (2013.01); *B29L 2031/565* (2013.01)

(58) Field of Classification Search
USPC .................................................. 215/200, 223
See application file for complete search history.

(56) References Cited

U.S. PATENT DOCUMENTS

| | | |
|---|---|---|
| 8,016,143 B2 | 9/2011 | Perrin et al. |
| 2006/0201905 A1* | 9/2006 | Perrin ................ B29C 45/4407 215/253 |
| 2008/0135512 A1 | 6/2008 | Long |

* cited by examiner

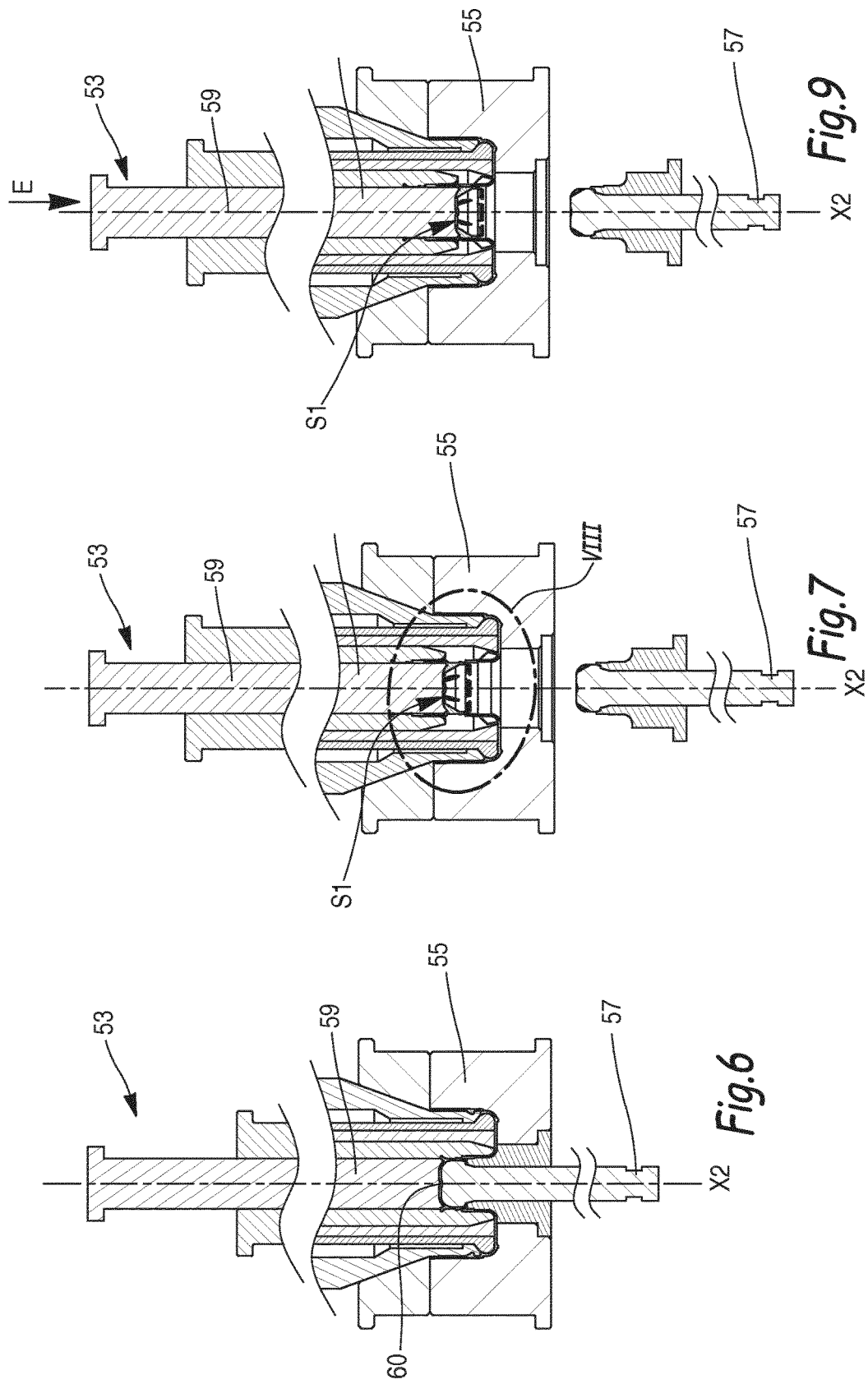

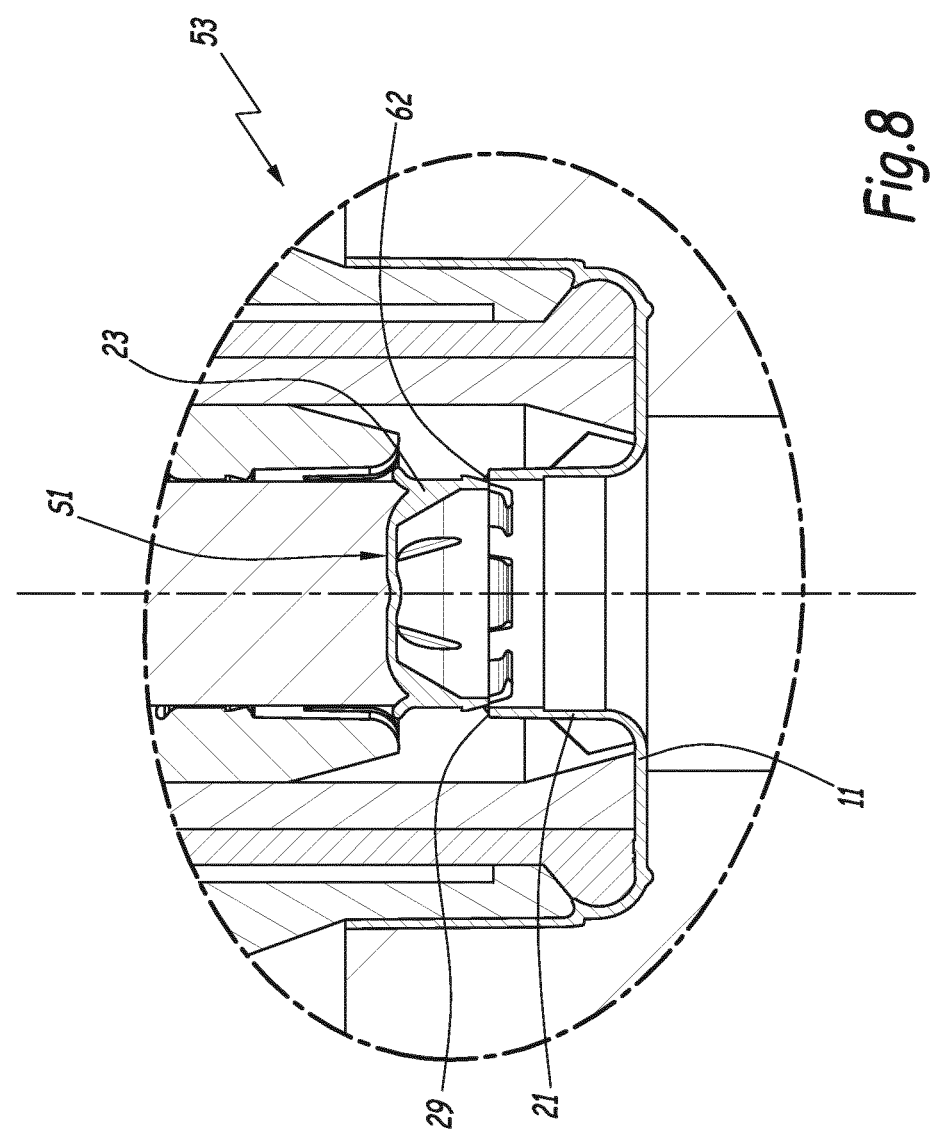

STOPPER FOR CLOSING NECK OF CONTAINER

CROSS-REFERENCE TO RELATED APPLICATIONS

This is a U.S. National Phase of PCT/EP2014/057319, filed on Apr. 10, 2014, which claims the benefit of priority to French Patent Application No. 1353385, filed on Apr. 15, 2013, which is incorporated herein by reference.

TECHNICAL FIELD

The present invention relates to a method for manufacturing a stopper for closing the neck of a container, a method for stoppering a container using a stopper manufactured according to such a manufacturing method, and a stopper for closing the neck of a container.

BACKGROUND

The invention relates in particular to the case of containers consisting of a bottle of liquid, able to contain at least about ten liters of liquid, especially water, typically three-, four- or five-gallon water bottles, which are used upside-down in water dispensers. The neck of these bottles is closed by a stopper of which the tubular skirt can be clipped or, more generally, wedged axially around the neck, or can be screwed on.

BRIEF SUMMARY

FIG. 11 shows a stopper 200 of the prior art, known from U.S. Pat. No. 8,016,143. The stopper 200 is moulded in one piece and comprises a sealing membrane 202 for sealing off a neck, provided with a central opening 204, a skirt 206 for attaching to the neck, and a tubular stem 208 extending around the central opening 204 from the sealing membrane 202. The stopper 200 also includes a capsule 210 which is connected by a tear strip 212 to a free end 214 of the stem 208, which free end faces away from the sealing membrane 202. This capsule 210 is attached to the remainder of the stopper such that it can be removed by breaking the tear strip 212. It is thus known to attach this stopper 200 onto a bottle of liquid and to install this bottle upside-down on a dispenser provided with a supply system including a supply tube. Thus, when the bottle is installed on the dispenser and its supply tube is inserted into the central opening 204 of the stopper, the tear strip 212 is broken under the action of this tube so as to move the capsule away in the opposite direction from the sealing membrane, the capsule comprising internal tabs 216 by means of which it can attach temporarily to the upper end of the supply tube. By means of this manoeuvre, the bottle is opened and the dispenser can be used. Moreover, when the bottle is removed from the dispenser, the capsule 210 is wedged in the stem 208, being forced into the latter by the supply tube, such that the bottle can be re-stoppered.

During manufacture of the stopper 200, the thickness and the continuity of the tear strip 212 are extremely important parameters. Indeed, in order to produce the stopper 200 in one piece, by plastic injection moulding, it is necessary that the tear strip 212 be, on one hand, thick enough for the plastic to be able to flow and form the capsule 210 during moulding and, on the other hand, not too thick, so that, when the bottle closed by the stopper 200 is installed on the dispenser, it is easy to separate the capsule 210 from the stem 208 by breaking the tear strip 212 and thus open the bottle. Furthermore, in order to ensure a good seal, the tear strip 212 must be continuous over the circumference of the stem 208 and the capsule 210. It is thus apparent that the stopper 200 of the prior art is difficult to mould in one piece and that a large force is often necessary in order to separate the capsule 210 from the stem 208 when installing, on a dispenser, a bottle comprising such a stopper 200.

The object of the present invention is to manufacture a stopper of the same type as mentioned hereinabove, which stopper is easy to open when installing, on a dispenser, a bottle comprising such a stopper, and is simple and quick to mould.

To that end, the invention relates to a method for manufacturing a stopper for closing a neck of a container, comprising a first step in which plastic is injected into a moulding cavity so as to form the stopper in one piece including a sealing membrane for sealing off the neck, provided with a central opening, a skirt for attaching to the neck, a tubular stem centred on an axis and extending around the central opening from the sealing membrane, and a capsule connected, by a tear wall, to a free end of the stem, which free end faces away from the sealing membrane, said capsule being designed to be wedged in the stem in a sealing manner after being separated from the remainder of the stopper by breaking the tear wall. In accordance with the invention, while the tear wall is intact, during a second step, a force, in line with the axis, is applied to the stopper so as to break, in one and the same relative movement of the capsule with respect to the remainder of the stopper, the tear wall and move the capsule inside the stem until it is wedged in the stem.

By virtue of the invention, the stopper is manufactured with the capsule wedged in the stem, the tear wall being broken when manufacturing the stopper. Thus, the force required to then remove or install a bottle comprising such a stopper on a dispenser is constant and, when the stopper is first used on the container, opening the stopper and placing it on the dispenser are made easier. Moreover, by virtue of the fact that the stopper is moulded in one piece and the tear wall is then broken, optimum interaction between the stem and the capsule wedged therein can be guaranteed, in comparison to the case in which the capsule and the remainder of the stopper are moulded as two separate pieces. Finally, there is no restriction on either the continuity or the thickness of the tear wall, since it is broken during manufacturing and, once the capsule is wedged in the stem, sealing is guaranteed.

According to advantageous but not compulsory aspects of the invention, such a stopper can incorporate one or more of the following features, considered in any technically permissible combination:

In the first step, the moulding cavity is able to form the stopper such that an internal peripheral face of the stem comprises on its circumference at least one catch for retaining the capsule, and such that the capsule is provided on an external peripheral face with a sealing means and an external lip, whereas in the second step the force is applied until, on one hand, the external lip is brought into contact with the retaining catch and, on the other hand, the sealing means is brought into contact with the free end of the stem.

The first and second steps are performed by one and the same moulding machine, including a mould and a core which are moved one with respect to the other, in line with the axis, so as to apply the force.

During the second step, the core is able to exert the force by moving in line with the axis in the direction of the sealing membrane.

The second step is performed by a machine other than a moulding machine, which machine includes a member able to exert the force by means of a relative movement in line with the axis of the member with respect to the remainder of the stopper.

The machine is able to attach a label onto a face of the sealing membrane, on the other side from the capsule, so as to cover the central opening whereas the member is able to exert the force by moving in line with the axis in the direction of the sealing membrane.

After the first step and before the second step is implemented, the tear wall is continuous and runs round the entire circumference of the capsule and of the free end.

After the first step and before the second step is implemented, the tear wall is discontinuous over the circumference of the capsule and of the free end.

The invention also relates to a method for stoppering the neck of a container using a stopper, in which the stopper is manufactured in accordance with the manufacturing method as defined hereinabove, then the stopper is attached to the neck without changing the position of the capsule with respect to the stem.

Finally, the invention relates to a stopper for closing the neck of a container, which stopper comprises a sealing membrane for sealing off the neck, provided with a central opening, a skirt for attaching to the neck, a tubular stem centred on an axis and extending around the central opening from the sealing membrane, and a capsule wedged in the stem. In accordance with the invention, this capsule is able to be wedged in the stem in a sealing manner after being separated from the remainder of the stopper by breaking a tear wall connecting the capsule to a free end of the stem, which free end faces away from the sealing membrane, the tear wall being designed to break under the effect of a force, exerted in line with the axis, which causes the capsule to move relative to the remainder of the stopper and causes the capsule to move inside the stem.

BRIEF DESCRIPTION OF THE DRAWINGS

The invention will be better understood and other advantages thereof will appear more clearly in light of the following description, given purely by way of example and with reference to the drawings, in which:

FIGS. 6 and 7 are views in section of a moulding machine, showing two successive stages of moulding the stopper of FIG. 1;

FIG. 8 is an enlarged view of the detail VIII of FIG. 7;

FIG. 9 is a view similar to FIGS. 6 and 7, showing a step subsequent to that shown in FIG. 7 and in connection with a first embodiment of the manufacturing method;

DETAILED DESCRIPTION

Figure 1:
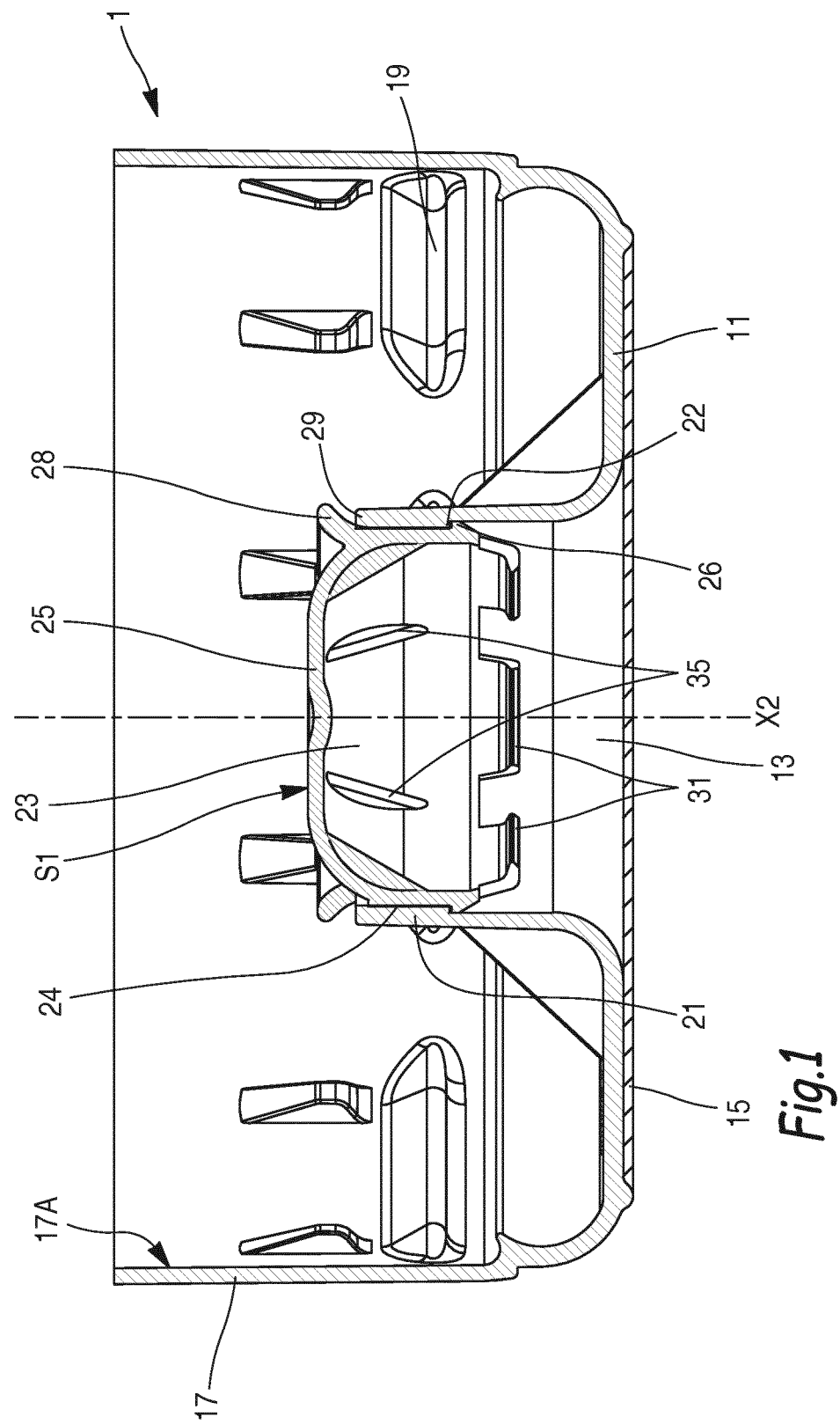
FIG. 1 is a longitudinal section through a stopper in accordance with the invention.

FIG. 1 shows a stopper 1. In a general manner, and as represented in FIGS. 2 to 5, the stopper 1 is designed to be used to close a neck 3 of a container 5. The container 5 is, for its part, intended to be inserted onto a dispenser 7 able to receive the container 5. The dispenser 7 comprises a supply tube 9 on which the stopper 1 and the container 5 are designed to be positioned in order to open the container 5 as explained below.

In general terms, the neck 3 is either made in one piece with the remainder of the container 5, in particular when the latter is a glass or plastic receptacle, or it is designed to be permanently secured on a wall of the container 5 at an opening through this wall. As detailed in the introductory portion of the present document, the container 5 is preferably a bottle containing at least about ten liters of liquid, in particular a water bottle having a capacity of three, four or five gallons.

Figure 4:
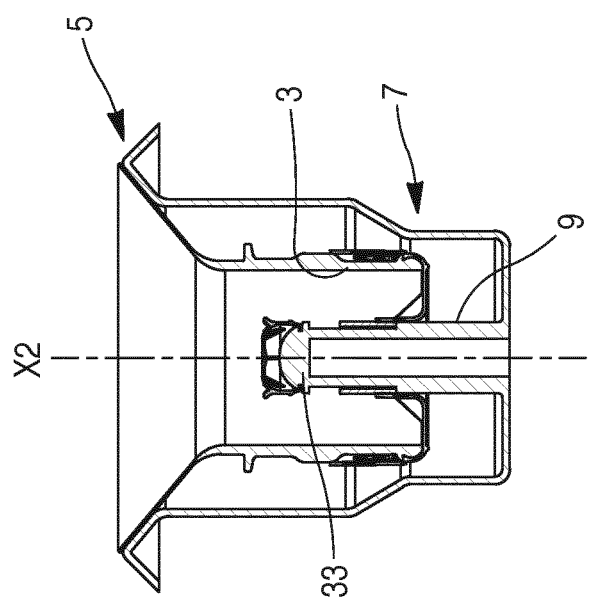
FIG. 4 is a view similar to FIG. 3, showing the container once it has been installed on the dispenser.

The stopper 1 comprises a roughly disc-shaped sealing membrane 11, provided with a central opening 13 having a circular base. The sealing membrane 11 and the central opening 13 are coaxial, being centred on an axis X2. As can be seen in FIG. 4, the axis X2 coincides with a central axis of the neck 3 when the container 5 is installed on the dispenser 7. For convenience, in the remainder of the description, the axis X2 of the stopper is considered as also being the axis of the neck 3.

Equally, for convenience, the following portion of the description of the stopper 1 is oriented with respect to the axis X2, considering that the terms "upper" and "up" relate to a portion of the stopper which is oriented axially towards the main body of the container 5 when the stopper 1 seals off the neck 3 of this container and, while the latter is installed on the dispenser 7, with its neck oriented downwards. By contrast, the terms "lower" and "down" correspond to the opposite axial direction. Similarly, the term "interior" indicates a portion of the stopper 1 which is oriented transversely to the axis X2, whereas the term "exterior" corresponds to an opposite transverse direction.

The stopper 1 is tubular in overall shape and is open at its upper end and closed at its lower end by the sealing membrane 11 which, when the stopper 1 is in the closing configuration on the neck 3, is arranged across an interior opening of the neck so as to seal off the latter. The lower face of the external peripheral portion of the sealing membrane 11 is generally used to support an applied label 15 or a similar element. Advantageously, the label 15 covers the central opening 13 and makes it possible to protect against the ingress of foreign bodies in the central opening 13 and allows the consumer to easily identify the water source used and/or the identity of the bottler. The label 15 is preferably welded rather than glued, in order to avoid the use of adhesive which may not be of food grade and to prevent the risk of the label 15 being stuck to the container 5 after it has been removed, thus making the bottlers' task easier while reducing the cost of cleaning upon return of the containers 5 upon which there is a deposit.

A skirt 17 of tubular overall shape extends upwards at the external periphery of the sealing membrane 11, this skirt being centred on the axis X2 and having a circular base, being created in one piece with the sealing membrane 11. The current portion of an interior face 17A of the skirt 17 is provided with inward-projecting protuberances 19. These protuberances 19 are designed to engage with the neck 3 in order to attach the skirt 17 coaxially around the neck 3 when the stopper 1 is in the closing configuration around this neck 3.

Figure 3:
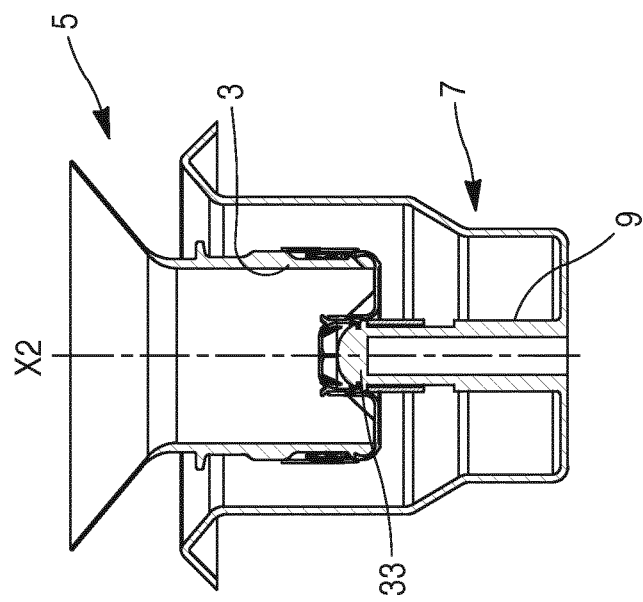
FIG. 3 is a view similar to FIG. 2, showing the container as it is being installed on the dispenser.

The stopper 1 also comprises a tubular stem 21 centred on the axis X2 and extending around the central opening 13 from the sealing membrane 11. The stem 21 extends in the same direction as the skirt 17 and coaxially therewith. In practice, the central opening and the stem 21 around the latter are both dimensioned so as to receive and guide the supply tube 9 of the dispenser 7 on which the container 5, closed by the stopper 1, is designed to be used, as can be seen in FIGS. 3 and 4.

The stopper 1 comprises a retaining catch 22 on the circumference of an internal peripheral face of the stem 21. The retaining catch helps to hold in position a capsule 23 wedged in the stem 21. More precisely, the capsule 23 comprises, on an external peripheral portion, an external lip 26 which engages with the retaining catch 22 so as to hold the capsule 23. The capsule 23 is tubular in shape and is coaxial with the stem 21, being centred on the axis X2. It thus comprises a tubular sidewall 24 which is in contact with the internal peripheral face of the stem 21 which is open at the bottom and is closed at the top by a closing wall 25. The capsule 23 is able to seal off the central opening 13 and thus to completely close the stopper 1. To that end, the contact between the external peripheral face of the sidewall 24 and the internal peripheral face of the stem 21 contributes to the sealing of the stopper 1.

Furthermore, the capsule 23 is advantageously provided with an external sealing means 28 which closes the stem 21 and is in contact with a free end 29 of the stem 21. The external sealing means 28 preferably consists of an external annular collar which is adjacent to the closing wall 25 of the capsule 23 and acts as a stop for the capsule 23 with respect to the stem 21 and presses against the free end 29 of the stem 21.

S1 denotes a face of the closing wall 25 which is oriented upwards and away from the sealing membrane 11. Both the face S1 and the closing wall 25 are substantially perpendicular to the axis X2.

Moreover, the capsule 23 is provided with internal gripping means 31, preferably consisting of latching tabs, which engage in an annular groove 32 provided on a free end 33 of the supply tube 9, as can be seen in FIG. 3. The capsule 23 is also provided with ribs 35 designed to ensure proper centering of the capsule on the free end 33 of the supply tube 9.

Figure 2:
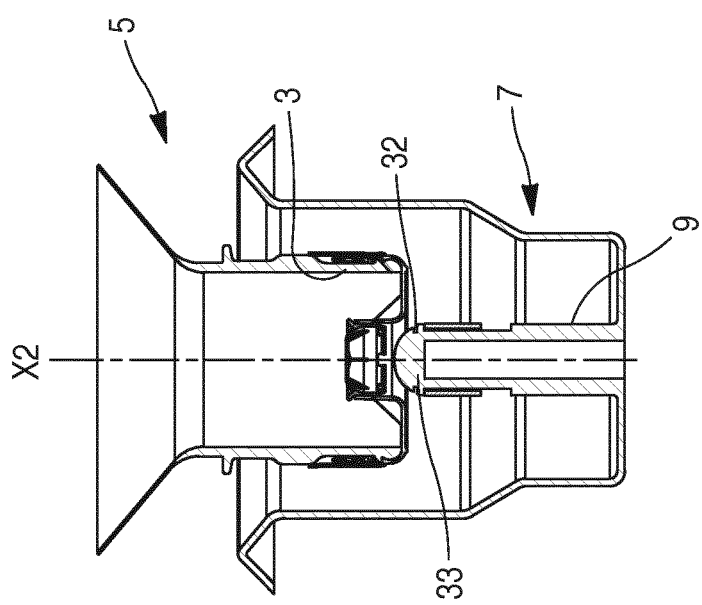
FIG. 2 is a view in section of the neck of a container provided with the stopper of FIG. 1, wherein the container is facing a dispenser.

In FIG. 2, the container 5 is upside-down and is ready to be fitted onto the supply tube 9. The axis X2 of the stopper is then aligned with a central axis of the supply tube 9 and of the dispenser 7. The central opening 13 is positioned facing the free end 33 by an operator and the container 5 is moved downwards. The capsule 23 is then attached onto the supply tube 9 via the intermediary of the internal gripping means 31 which engage in the annular groove 32, as shown in FIG. 3. At the same time, the ribs 35 make it easier to centre the capsule 23 on the free end 33. The operator then carries on moving the container 5 downwards such that the capsule 23 remains attached on the free end 33 and that the sidewall 24 is no longer in contact with the internal peripheral face of the stem 21. Thus, as can be seen in FIG. 4, the stopper 1 is open since the central opening 13 is no longer sealed off by the capsule 23.

Figure 5:
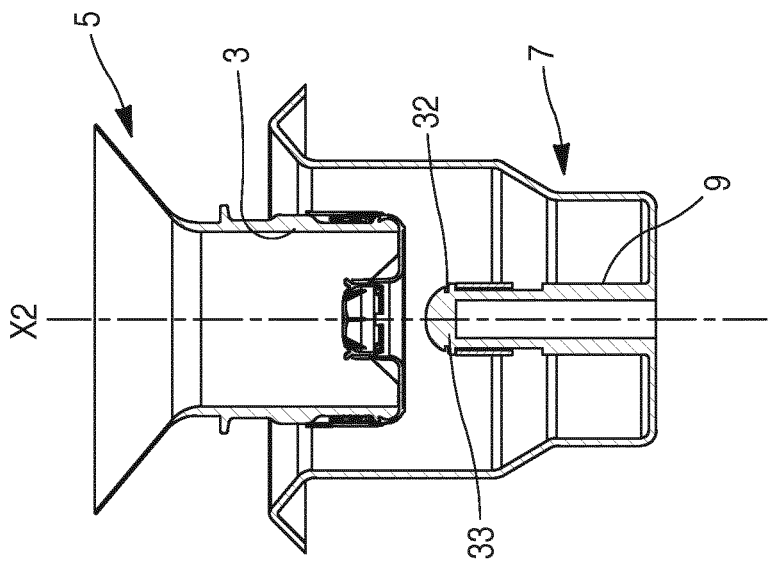
FIG. 5 is a view similar to FIGS. 3 and 4, upon removal of the container from the dispenser.

When the container 5 is removed from the dispenser 7, as represented in FIG. 5, that is to say when the container 5 is moved upwards, the capsule 23 is brought back into the stem 21. More precisely, at the same time as the container is moved, the supply tube 9 forcefully wedges the capsule 23 in the stem 21, the sidewall 24 being wedged against the internal peripheral face of the stem 21. By means of the force exerted by the operator when removing the container, the gripping means 31 disengage from the annular groove 32 of the free end 33, the capsule 23 wedges itself in the stem and the external sealing means 28 closes the stem 21, as shown in FIG. 5. The capsule thus regains its configuration of FIG. 2. It is thus possible, after the container 5 has been opened, to re-stopper it when it is removed from the dispenser 7.

As described above, the capsule 23 is both able to be detached from the stem 21, more generally from the remainder of the stopper 1, and to be wedged in this same stem 21. This has the advantage of allowing the container 5 to be removed from the dispenser 7 even when the container 5 is not entirely empty. This manoeuvre is, for example, required in order to clean the dispenser 7 or for any other maintenance operation. This also has the advantage that the container 5 can be returned to the bottler while protecting the inside of the container from any contaminants, which thus makes the selection of washing detergents easier.

In order to manufacture the stopper 1, a moulding machine 53, for example, is used, which machine comprises a mould 55, a first central core 57 and a second central core 59. The first central core 57 and the second central core 59 engage with the mould 55 in order to mould the stopper 1: the assembly formed by the first core 57 and the second core 59, as well as by the mould 55, defines a cavity 60 for moulding the stopper. A central axis of the moulding machine 53 coincides with the axis X2 of the stopper 1, the two cores 57, 59 being centred on the axis X2. The moulding machine 53 is preferably a machine for plastic injection moulding.

FIG. 6 shows a first step in moulding the stopper 1. The cores 57, 59 engage with the mould 55 and plastic is injected into the moulding cavity 60. More precisely, the two cores 57, 59 are in contact with the mould 55 and with the closing wall 25 and are positioned opposite one another with respect to the closing wall 25.

After this first step, during a second step corresponding to FIG. 7, the first central core 57 is removed and drops down along the axis X2. The moulded stopper is then in accordance with the stopper 200 of the prior art, shown in FIG. 10: a tear wall 62 connects the free end 29 and the capsule 23. The tear wall 62 can be clearly seen in FIG. 8, in the enlargement of the detail VIII of FIG. 7. Thus, as shown in FIGS. 6 to 8, during manufacture of the stopper 1, the stopper 1 is moulded beforehand such that the capsule 23 is attached in a removable manner by means of the tear wall 62 at the free end 29 of the stem 21, which free end faces away from the sealing membrane 11.

During a third step, the second core 59 applies a thrust force E along the axis X2 in the direction of the sealing membrane 11 against the face S1, which is perpendicular to the axis X2, until the tear wall 62 is torn and the capsule 23 is wedged in the stem 21. More precisely, the second core 59 moves downwards, along the axis X2, while the mould 55 is immobilized in order to avoid any possible deformation of the remainder of the stopper 1 resulting from the force E. The second core 59 thus moves with respect to the mould 55 and the capsule 23 is moved with respect to the remainder of the stopper. The capsule 23 is moved downwards towards the sealing membrane 11, until it is wedged in the stem 21.

Thus, the second central core 59 exerts the force E in order to place the sidewall 24 of the capsule 23 in contact with the internal peripheral face of the stem 21, the retaining catch 22 in contact with the external lip 26, and the sealing means 28 in contact with the free end 29. FIG. 9 shows that the capsule 23 is wedged in the stem 21 after the tear wall 62 has been broken.

It is important to note that, during the second and third steps, the first central core 57 has been removed from the stem 21 and from the capsule 23 the moulding of which it has made possible, and that, before the third step, the tear wall 62 is intact.

Moreover, FIGS. 6 to 9 show that the stopper is moulded in one piece, by means of which possible contamination, which can occur when the stopper is made in two or more pieces which must be stored and manipulated before being assembled, can be avoided. This one-piece moulding is equally important in that it allows the stopper to be given any desired colour, which is impossible when the stopper is made of a plurality of plastic parts which must be assembled by welding or any other means. Moreover, it is possible by virtue of the one-piece moulding to ensure optimum interaction between the capsule 23 and the stem 21.

Figure 11:
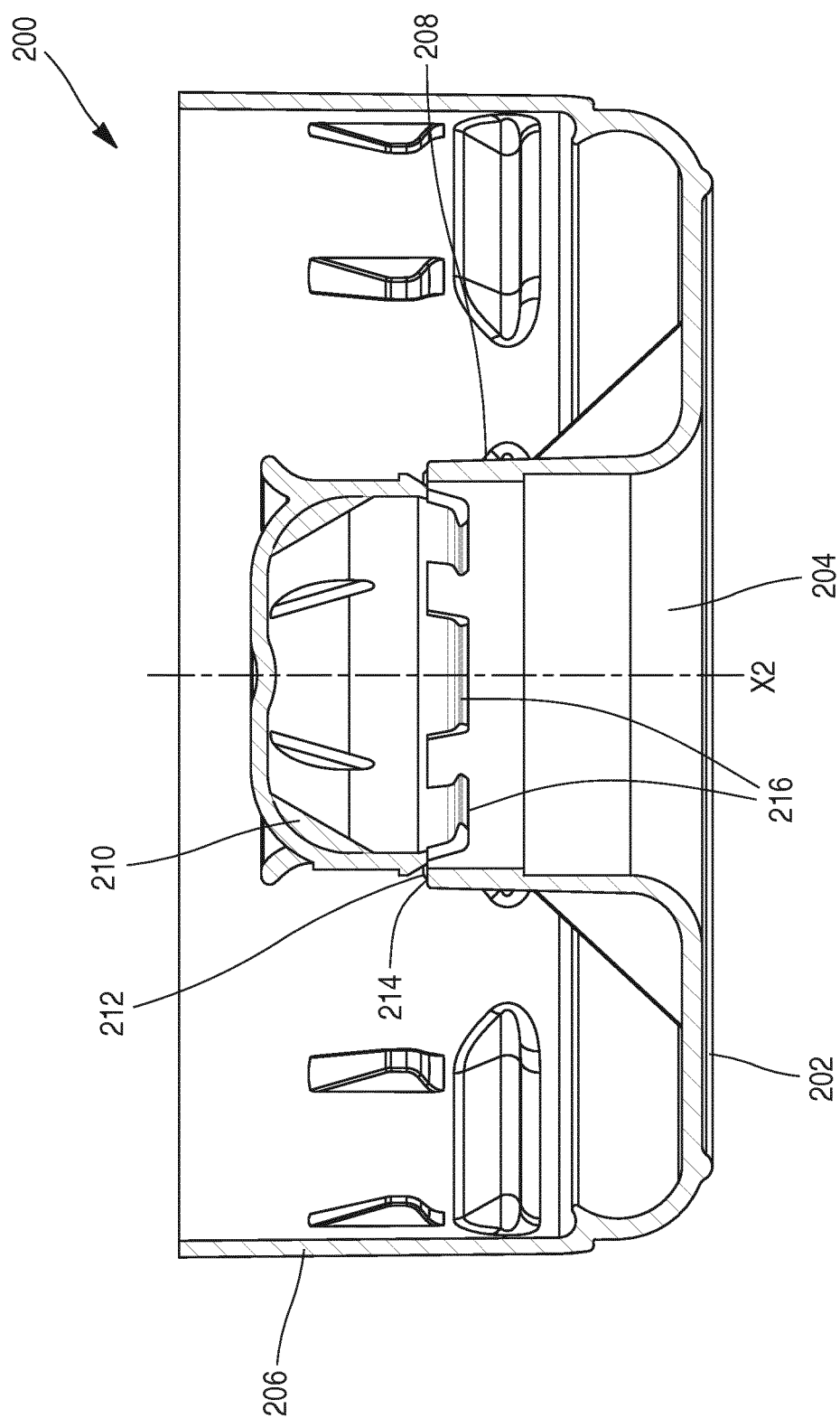
FIG. 11 is a longitudinal section through a stopper in accordance with the prior art.

In a second embodiment, instead of having three steps by means of which the stopper 1 can be manufactured, and instead of these steps all being performed by the moulding machine 53, the moulding machine 53 serves only to form a stopper in accordance with the prior art and corresponding to that of FIG. 11. That is to say that the moulding machine 53 carries out only the first and second steps. Then, application of the force E thrusting the capsule 23 into the stem 21, accompanied by the breaking of the tear wall 62, is performed using a different machine to the moulding machine 53. This second machine includes a member which is able to exert the thrust force E.

Figure 10:
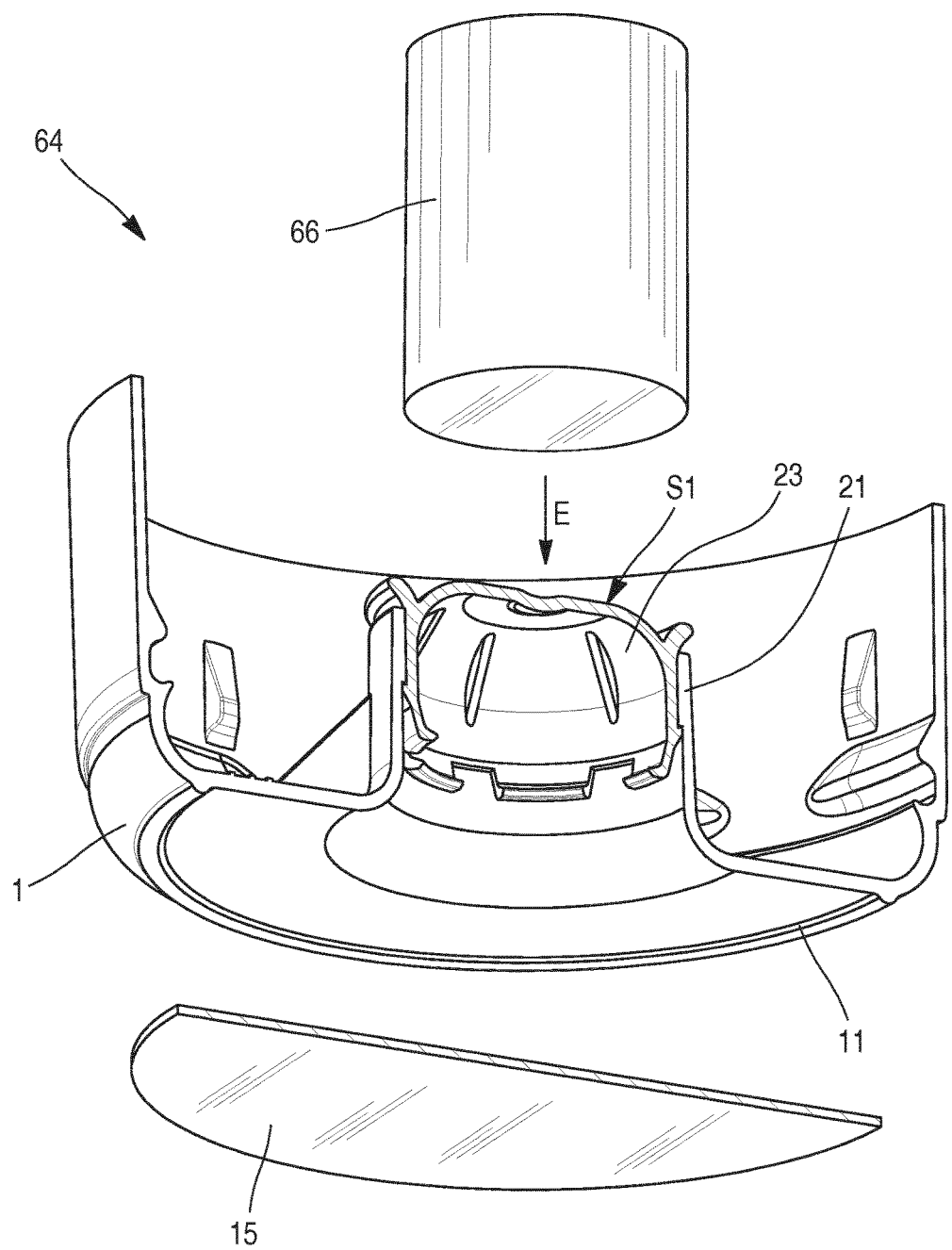
FIG. 10 is a schematic representation of a labelling machine in connection with a second embodiment of the manufacturing method.

This second machine is, for example, as represented in FIG. 10, a labelling machine 64 by means of which it is possible to perform the third step and thus to wedge the capsule 23 in the stem 21 and to break the tear wall 62. The labelling machine 64 is represented very schematically and is able to attach the label 15 onto an external face of the sealing membrane 11. Moreover, the labelling machine comprises a member which is able to exert the thrust force E in a similar manner to that described for the third step performed by the moulding machine 53. The member 66, during a step corresponding to the third step, is positioned facing the face S1 and moves towards the sealing membrane 11, bearing in mind that the remainder of the stopper is immobilized with respect to the member 66 in order to avoid any possible deformation of the remainder of the stopper 1 as a result of the force E. The member 66 then makes contact with the face S1 and moves the capsule 23 with respect to the remainder of the stopper until the capsule 23 is wedged in the stem 21 and the tear wall 62 is torn.

Thus, the machine 64 can be used both for labelling and for thrusting the capsule 23 into the stem 21 by means of the member 66.

As a variant, a machine other than the labelling machine 64 and other than the moulding machine 53 can be used to perform the third step of inserting the capsule into the stem 21.

By means of the manufacturing method presented it is possible, during the first moulding step, to mould the stopper 1 with the thick tear wall 62 since the breaking of this tear wall 62 is not performed manually but by a machine able to apply a large thrust force E. Thus, the thickness of the tear wall, measured radially with respect to the axis X2, is greater than 0.15 mm. Moreover, since the stopper 1 is provided to be mounted on a container, with the capsule 23 wedged in the stem 21, the tear wall 62 can have various configurations.

In a first configuration, before the third step, the tear wall 62 is continuous and runs round the entire circumference of the capsule 23 and of the free end 29. In a second configuration, the tear wall is discontinuous over the circumference of the capsule 23 and of the free end 29 and comprises a plurality of sections.

The manufacturing method is thus made easier since the tear wall 62, during manufacturing of the stopper, can be thick which makes it easier to mould the stopper and significantly reduces the moulding time. Furthermore, it is not necessary to have a tear wall which is continuous over the entire circumference of the capsule 23 and of the free end. Finally, the stopper 1 is supplied as a single part with the capsule 23 wedged in the stem 21. The fact that the capsule 23 is wedged in the stem 21 makes it easier to fit the stopper 1 onto a dispenser 7 and to separate the capsule 23 with the stem 21 in order to open the container 5. Indeed, it is not necessary to tear the tear wall 62 when installing the container 5 on a dispenser 7, thus making the fitting easier. It is thus possible to avoid all risk of damage to the supply tube 9 when fitting the container 5 comprising the stopper 1 onto the dispenser 7. Indeed, the operator who comes to attach the container 5 onto the dispenser 7 does not need to apply a large force in order to open the stopper 1.

Moreover, in comparison to the stopper 200 of the prior art shown in FIG. 11, the stopper 1 of FIG. 1 comprises no tear strip once manufactured.

Furthermore, the force required to remove the container 5 from the dispenser or to place it on the dispenser is the same, whatever the operation.

Moreover, when the container 5 is stoppered, the stopper 1 is attached to the container 5 without changing the position of the capsule 23 with respect to the stem 21. Indeed, the capsule 23 forms, with the remainder of the stopper 1, a single part which is attached to the neck 3 of the container 5. Moreover, the capsule 23 is in direct contact with the stem 21 before the stopper 1 is used, that is to say that the external periphery of the capsule 23 is in direct contact with the internal periphery of the stem 21.

In one variant, when thrusting the capsule 23 into the stem 21, instead of a central core 59 or a member moving along the axis X2 towards the sealing membrane, the mould 55 or the remainder of the stopper is moved axially towards the central core 59 or the member 66. Thus, a thrust force is exerted on the mould or on the remainder of the stopper and the capsule 23 wedges in the stem 21.

The invention claimed is:

1. A method for manufacturing a stopper for closing a neck of a container, the method comprising:
 injecting plastic into a molding cavity so as to form the stopper in one piece, the stopper including:
 a sealing membrane configured to seal off the neck of the container, and being provided with a central opening,
 a skirt configured to be attached to the neck of the container,
 a tubular stem centered on an axis and extending from the sealing membrane around the central opening, and
 a capsule connected, by a tear wall, to a free end of the stem, the free end facing away from the sealing membrane, wherein the capsule is configured to be wedged in the stem to seal the neck of the container after being separated from the remainder of the stopper by breaking the tear wall, while the tear wall is intact, applying a force along the axis to the stopper so as to, in a single movement of the capsule relative to the remainder of the stopper, break the tear wall and move the capsule inside the stem until the capsule is wedged in the stem.

2. The method according to claim 1, wherein:

the molding cavity forms the stopper such that an internal peripheral face of the stem includes at least one catch configured to retain the capsule, and such that the capsule is provided on an external peripheral face with a sealing member and an external lip, and the force on the stopper is applied until the external lip is brought into contact with the at least one catch and the sealing member is brought into contact with the free end of the stem.

3. The method according to claim 1, wherein injecting plastic into the molding cavity and applying the force to the stopper are both performed by the same machine, the machine including a mold and a core which are moved with respect to each other, along the axis, so as to apply the force on the stopper.

4. The method according to claim 3, wherein the core exerts the force by moving along the axis towards the sealing membrane.

5. The method according to claim 1, wherein injecting plastic into the molding cavity is performed by a first machine, and applying the force to the stopper is performed by a second machine, the second machine including a member configured to exert the force the axis with respect to the remainder of the stopper.

6. The method according to claim 5, the second machine is configured to attach a label onto a face of the sealing membrane, on the other side from the capsule, so as to cover the central opening, and wherein the member is configured to exert the force by moving along the axis towards the sealing membrane.

7. The method according to claim 1, wherein, after the plastic is injected into the molding cavity and before the force is applied to the stopper, the tear wall is continuous and runs round the entire circumference of the capsule and of the free end.

8. The method according to claim 1, wherein, after the plastic is injected into the molding cavity and before the force is applied to the stopper, the tear wall is discontinuous over the circumference of the capsule and of the free end.

9. A method for closing a neck of a container using a stopper manufactured in accordance with the method according to claim 1, and wherein the stopper is attached to the neck without changing the position of the capsule with respect to the stem.

10. A stopper for closing a neck of a container, comprising:
a sealing membrane configured to seal off the neck of the container, and being provided with a central opening,
a skirt configured to be attached to the neck of the container,
a tubular stem centered on an axis and extending from the sealing membrane around the central opening, and
a capsule configured to be wedged in the stem, wherein the capsule is configured to be wedged in the stem to seal the neck of the container after being separated from the remainder of the stopper by breaking a tear wall connecting the capsule to a free end of the stem, the free end facing away from the sealing membrane, and wherein the tear wall is configured to break via a force, exerted along the axis, which causes the capsule to move inside the stem in a single movement relative to the remainder of the stopper.

11. The stopper according to claim 10, wherein:
an internal peripheral face of the stem includes at least one catch configured to retain the capsule;
the capsule is provided on an external peripheral face with a sealing member and an external lip; and
the external lip is configured to be brought into contact with the at least one catch and the sealing member is configured to be brought into contact with the free end of the stem, via the force exerted.

12. The stopper according to claim 10, further comprising a label attached onto a face of the sealing membrane, on the opposite side from the capsule, so as to cover the central opening.

13. The stopper according to claim 10, wherein, before the force is exerted, the tear wall is continuous and runs around an entire circumference of the capsule and of the free end.

14. The stopper according to claim 10, wherein, before the force is exerted, the tear wall is discontinuous over the circumference of the capsule and of the free end.

15. The stopper according to claim 10, wherein the sealing membrane is disc-shaped, and wherein the central opening includes a circular base.

16. The stopper according to claim 15, wherein the sealing membrane and the central opening are coaxial and centered on the axis.

17. The stopper according to claim 10, wherein the skirt is tubular in shape and is configured to extend upward at an external periphery of the sealing membrane.

18. The stopper according to claim 10, wherein an internal surface of the skirt further includes at least one inward-projecting protuberance configured to engage with the neck of the container so as to attach the skirt coaxially around the neck of the container.

19. The stopper according to claim 10, wherein the capsule further includes at least one latching tab.

20. The stopper according to claim 10, wherein the capsule further includes at least one rib.

* * * * *